(12) United States Patent
Oda et al.

(10) Patent No.: US 11,270,322 B2
(45) Date of Patent: Mar. 8, 2022

(54) SENSOR MANAGEMENT UNIT, METHOD, AND PROGRAM FOR TRANSMITTING SENSING DATA AND METADATA

(71) Applicant: OMRON Corporation, Kyoto (JP)

(72) Inventors: Toshihiko Oda, Kusatsu (JP); Tetsuji Yamato, Yokohama (JP); Takeshi Naito, Tokyo (JP); Sangryul Lee, Kusatsu (JP); Ryota Yamada, Tokyo (JP); Shuichi Misumi, Kyoto (JP)

(73) Assignee: OMRON Corporation, Kyoto (JP)

( * ) Notice: Subject to any disclaimer, the term of this patent is extended or adjusted under 35 U.S.C. 154(b) by 168 days.

(21) Appl. No.: 16/618,413

(22) PCT Filed: Jun. 20, 2018

(86) PCT No.: PCT/JP2018/023419
§ 371 (c)(1),
(2) Date: Dec. 2, 2019

(87) PCT Pub. No.: WO2019/026453
PCT Pub. Date: Feb. 17, 2019

(65) Prior Publication Data
US 2021/0142340 A1 May 13, 2021

(30) Foreign Application Priority Data

Aug. 1, 2017 (JP) .............................. JP2017-149190
Nov. 24, 2017 (JP) .............................. JP2017-225795

(51) Int. Cl.
*G06Q 30/02* (2012.01)
*G06F 16/907* (2019.01)
(Continued)

(52) U.S. Cl.
CPC ....... *G06Q 30/0201* (2013.01); *G06F 16/907* (2019.01); *G06F 16/957* (2019.01); *H04L 67/02* (2013.01); *H04L 67/12* (2013.01)

(58) Field of Classification Search
CPC .......... G06F 13/00; G06F 16/00; G06F 16/23; G06F 16/164; G06F 16/245;
(Continued)

(56) References Cited

U.S. PATENT DOCUMENTS

2006/0224619 A1* 10/2006 Kang ................ H04N 21/6125
2007/0282944 A1    12/2007 Odaka et al.
(Continued)

FOREIGN PATENT DOCUMENTS

CA      2932829 A1    6/2015
CN      101009617 A   8/2007
(Continued)

OTHER PUBLICATIONS

Office Action dated Jul. 23, 2020 in a counterpart Chinese patent application.
(Continued)

*Primary Examiner* — Jeffrey R Swearingen
(74) *Attorney, Agent, or Firm* — Metrolex IP Law Group, PLLC

(57) ABSTRACT

A sensor management unit transmits first sensing data obtained by a first sensor monitoring a target to an external device external to the sensor management unit. The sensor management unit includes a processor, and a memory storing a program. The memory stores obtaining condition information that defines obtaining conditions for obtaining a plurality of candidate items of metadata to be associated with the first sensing data. The program causes the processor to implement obtaining at least one of the candidate items of metadata in accordance with the obtaining conditions and
(Continued)

transmitting, to the external device, the obtained first sensing data and the obtained metadata in a manner associated with each other.

20 Claims, 11 Drawing Sheets

(51) Int. Cl.
*G06F 16/957* (2019.01)
*H04L 67/02* (2022.01)
*H04L 67/12* (2022.01)

(58) Field of Classification Search
CPC .... G06F 16/254; G06F 16/285; G06F 16/907; G06F 16/957; G06F 16/2291; G06F 16/5866; G06F 16/7867; G06F 16/9554; G06F 17/30; G06F 17/30011; G06F 17/30342; G06F 17/30345; G06F 17/30864; G06F 17/30867; G06F 17/30879; G06F 19/00; G06F 19/322; G06F 19/3418; G06F 40/143; G06Q 10/10; G06Q 10/0639; G06Q 10/1093; G06Q 10/06375; G06Q 30/02; G06Q 30/0201; G06Q 30/0202; G06Q 50/10; G08C 15/00; G16H 10/60; G16H 30/40; G16H 40/67; H04L 29/08; H04L 61/609; H04L 67/00; H04L 67/02; H04L 67/12; H04M 11/00; H04Q 9/00
USPC .......................................... 705/7.29; 707/736
See application file for complete search history.

(56) References Cited

U.S. PATENT DOCUMENTS

| | | | | |
|---|---|---|---|---|
| 2012/0038462 A1* | 2/2012 | Adler | .................... | H04Q 9/00 340/10.1 |
| 2012/0042326 A1 | 2/2012 | Jain et al. | | |
| 2012/0086568 A1* | 4/2012 | Scott | .................... | G08B 13/00 340/501 |
| 2012/0150893 A1 | 6/2012 | Inoue et al. | | |
| 2013/0121525 A1* | 5/2013 | Chen | .................... | G06T 3/0062 382/100 |
| 2013/0144562 A1 | 6/2013 | Ohmae et al. | | |
| 2014/0359552 A1 | 12/2014 | Misra et al. | | |
| 2014/0372561 A1 | 12/2014 | Hisano | | |
| 2015/0241979 A1 | 8/2015 | Nakanishi et al. | | |
| 2016/0307378 A1 | 10/2016 | McNally et al. | | |
| 2017/0109391 A1* | 4/2017 | Rosen | .................... | G06F 16/285 |
| 2017/0308692 A1 | 10/2017 | Yano | | |
| 2018/0341500 A1 | 11/2018 | Yamato | | |

FOREIGN PATENT DOCUMENTS

| | | |
|---|---|---|
| CN | 102576373 A | 7/2012 |
| CN | 103109163 A | 5/2013 |
| CN | 103891201 A | 6/2014 |
| CN | 104581639 A | 4/2015 |
| CN | 104769937 A | 7/2015 |
| CN | 106796703 A | 5/2017 |
| EP | 2919459 A1 | 9/2015 |
| JP | 5445722 B1 | 3/2014 |
| JP | 2015-162860 A | 9/2015 |
| JP | 2017-102793 A | 6/2017 |

OTHER PUBLICATIONS

International Search Report of PCT/JP2018/023419 dated Jul. 17, 2018.
Written Opinion of PCT/JP2018/023419 dated Jul. 17, 2018.
Extended European search report (EESR) dated Mar. 22, 2021 in a counterpart European patent application.

* cited by examiner

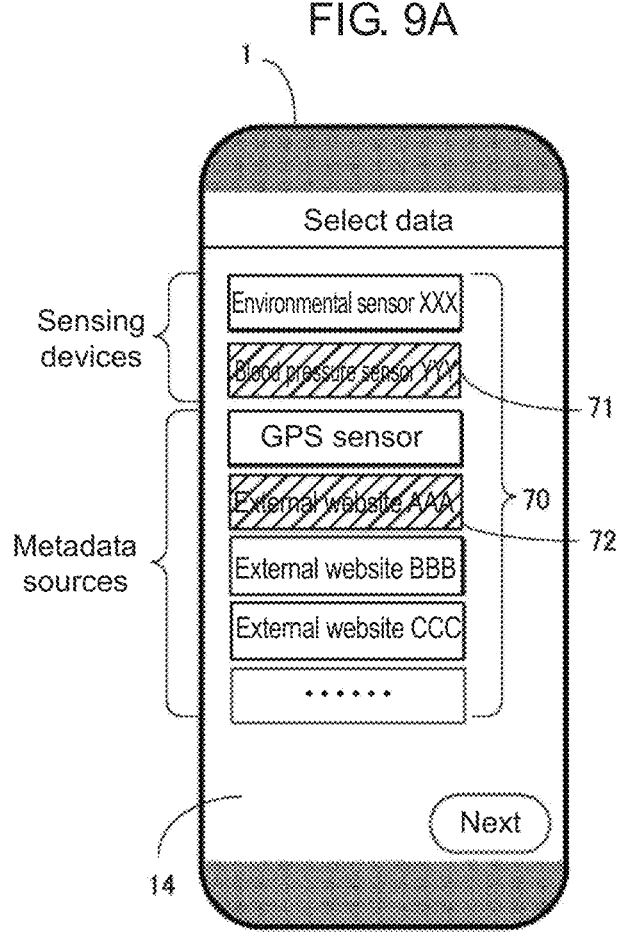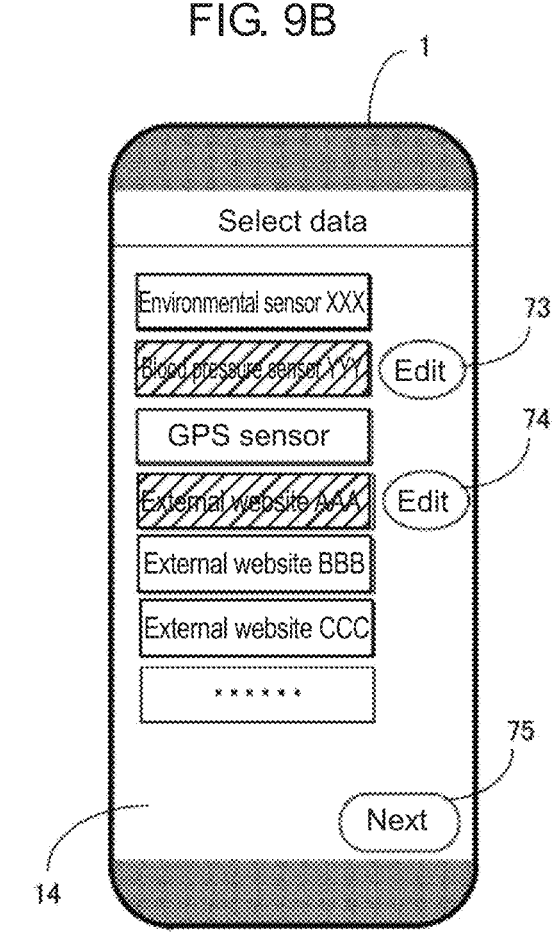

SENSOR MANAGEMENT UNIT, METHOD, AND PROGRAM FOR TRANSMITTING SENSING DATA AND METADATA

FIELD

The present invention relates to a sensor management unit, a method, and a program.

BACKGROUND

Japanese Patent No. 5445722 (Patent Literature 1) describes a sensor network using sensing data obtained by sensors. In this sensor network, sensing data is distributed. More specifically, a data provider provides sensing data to a data user in this sensor network (refer to Patent Literature 1).

CITATION LIST

Patent Literature

Patent Literature 1: Japanese Patent No. 5445722

SUMMARY

Technical Problem

In the sensor network described in Patent Literature 1, a data user obtains sensing data from a data provider. However, when the background of the sensing data obtained with a sensor is unknown and the data reliability cannot be verified, for example, the data user cannot use the obtained sensing data effectively. The obtained sensing data may not be useful in this case.

One or more aspects of the present invention are directed to a sensor management unit, a method, and a program that increase the usefulness of sensing data.

Solution to Problem

In response to the above issue, the sensor management unit, method, and program according to one or more aspects of the present invention have the structure described below.

More specifically, a sensor management unit according to one aspect of the present invention transmits first sensing data obtained by a first sensor monitoring a target to an external device external to the sensor management unit. The sensor management unit includes a processor, and a memory storing a program executable by the processor. The memory stores obtaining condition information that defines obtaining conditions for obtaining a plurality of candidate items of metadata to be associated with the first sensing data. The program causes the processor to implement obtaining the first sensing data, obtaining at least one of the candidate items of metadata in accordance with the obtaining conditions, and transmitting, to the external device, the obtained first sensing data and the obtained metadata in a manner associated with each other.

The sensor management unit stores obtaining conditions for obtaining each candidate item of metadata. Appropriate metadata is associated with the first sensing data. The appropriate metadata associated with the first sensing data allows the user of the first sensing data (e.g., the owner of the external device or a person who obtains the first sensing data from the external device) to more accurately determine the background of the first sensing data obtained with the first sensor, thus allowing more accurate analysis or other processes using the first sensing data. More specifically, the sensor management unit increases the usefulness of the first sensing data by associating appropriate metadata with the first sensing data.

The sensor management unit according to the above aspect may further include an input interface that receives selection of at least one of the candidate items of metadata. The transmitting may include transmitting, to the external device, the obtained first sensing data and the metadata items selected through the input interface in a manner associated with each other.

The sensor management unit allows selection of metadata items to be associated with the first sensing data. The sensor management unit thus allows, for example, the metadata found appropriate by the user to be associated with the first sensing data.

The sensor management unit according to the above aspect may further include an input interface that receives selection of at least one of the candidate items of metadata. The obtaining at least one of the candidate items of metadata may include obtaining the metadata items selected through the input interface in accordance with the obtaining conditions.

The sensor management unit allows selection of metadata items to be associated with the first sensing data. The sensor management unit thus allows, for example, the metadata found appropriate by the user to be associated with the first sensing data.

In the sensor management unit according to the above aspect, the candidate items of metadata may include personal information from which a user of the sensor management unit is identified, and the personal information may be stored in a website on the Internet.

The sensor management unit allows the personal information of the user registered with the website to be associated with the first sensing data as metadata. With this structure, the user of the first sensing data can understand the background of the obtained first sensing data by referring to the metadata representing the personal information of the user. The structure thus allows the user to conduct more accurate analysis or other processes using the first sensing data. More specifically, the sensor management unit increases the usefulness of the first sensing data by associating the personal information registered with the website with the first sensing data.

In the sensor management unit according to the above aspect, the candidate items of metadata may include a use history of a website by a user of the sensor management unit, and the use history may be stored in the website on the Internet.

The sensor management unit allows the use history of the website by the user to be associated with the first sensing data as metadata. With this structure, the user of the first sensing data can understand the background of the obtained first sensing data by referring to the metadata representing the use history of the website by the user (e.g., purchase history of the user for an online shopping website). The structure thus allows the user to conduct more accurate analysis or other processes using the first sensing data. More specifically, the sensor management unit increases the usefulness of the first sensing data by associating the use history of the website by the user with the first sensing data.

In the sensor management unit according to the above aspect, the memory may store login information used to log in the website, and the obtaining at least one of the candidate items of metadata may include accessing the website using the login information.

The sensor management unit obtains the information stored in the website (the personal information and the use history) using the login information stored in the memory.

The sensor management unit can thus obtain the information stored in the website that requests login information of the user to access the website.

In the sensor management unit according to the above aspect, the obtaining conditions may include a time to access the website.

The sensor management unit stores the defined time to access each website, and accesses each website at an appropriate time to obtain each metadata item.

In the sensor management unit according to the above aspect, the memory may store personal information from which a user of the sensor management unit is identified, and the candidate items of metadata may include the personal information stored in the memory.

The sensor management unit associates, as metadata, the user's personal information stored in the memory with the first sensing data. With this structure, the user of the first sensing data can understand the background of the obtained first sensing data by referring to the metadata representing the personal information of the user. The structure thus allows the user to conduct more accurate analysis or other processes using the first sensing data. More specifically, the sensor management unit increases the usefulness of the first sensing data by associating the personal information stored in the memory with the first sensing data.

In the sensor management unit according to the above aspect, the program may further cause the processor to implement obtaining second sensing data obtained by a second sensor monitoring a target, and the candidate items of metadata may include the second sensing data.

The sensor management unit can associate the second sensing data with the first sensing data. More specifically, the sensor management unit can associate information about the background of the obtained first sensing data (second sensing data), which cannot be obtained by the first sensor alone, with the first sensing data. The sensor management unit thus increases the usefulness of the first sensing data by associating the second sensing data with the first sensing data.

In the sensor management unit according to the above aspect, the metadata obtained in the obtaining at least one of the candidate items of metadata may include personal information from which a user of the sensor management unit is identified, and the program may further cause the processor to implement anonymizing the metadata into anonymized information. The anonymized information is information from which the user is not identified.

When the metadata obtained in the obtaining at least one of the candidate items of metadata includes personal information, the sensor management unit anonymizes the obtained metadata. The sensor management unit may thus associate the user-unidentified anonymized information with the first sensing data as metadata, thus preventing the personal information from leaking unintentionally.

In the sensor management unit according to the above aspect, the metadata obtained in the obtaining at least one of the candidate items of metadata may include personal information from which a user of the sensor management unit is identified, and the program may further cause the processor to implement either anonymizing the metadata into anonymized information or deleting the metadata. The anonymized information is information from which the user is not identified.

When the metadata obtained in the obtaining at least one of the candidate items of metadata includes personal information, the sensor management unit either anonymizes or deletes the obtained metadata. The sensor management unit thus prevents the personal information from leaking unintentionally by performing more appropriate processing.

A method according to another aspect of the present invention transmits first sensing data obtained by a first sensor monitoring a target to an external device external to a sensor management unit. The method includes storing obtaining condition information that defines obtaining conditions for obtaining a plurality of candidate items of metadata to be associated with the first sensing data, obtaining the first sensing data, obtaining at least one of the candidate items of metadata in accordance with the obtaining conditions, and transmitting, to the external device, the obtained first sensing data and the obtained metadata in a manner associated with each other.

The method includes storing obtaining conditions for obtaining each candidate item of metadata, and associating appropriate metadata with the first sensing data. The appropriate metadata associated with the first sensing data allows the user of the first sensing data to more accurately determine the background of the obtained first sensing data, thus allowing more accurate analysis or other processes using the first sensing data. More specifically, the method increases the usefulness of the first sensing data by associating appropriate metadata with the first sensing data.

A program according to another aspect of the present invention causes a processor included in a sensor management unit to implement transmitting first sensing data obtained by a first sensor monitoring a target to an external device external to the sensor management unit. The sensor management unit includes a memory storing obtaining condition information that defines obtaining conditions for obtaining a plurality of candidate items of metadata to be associated with the first sensing data. The program causes the processor to implement obtaining the first sensing data, obtaining at least one of the candidate items of metadata in accordance with the obtaining conditions, and transmitting, to the external device, the obtained first sensing data and the obtained metadata in a manner associated with each other.

The memory stores obtaining conditions for obtaining each candidate item of metadata, and the program causes appropriate metadata to be associated with the first sensing data. The appropriate metadata associated with the first sensing data allows the user of the first sensing data to more accurately determine the background of the obtained first sensing data, thus allowing more accurate analysis or other processes using the first sensing data. More specifically, the program increases the usefulness of the first sensing data by associating appropriate metadata with the first sensing data.

Advantageous Effects

The sensor management unit, method, and program according to the above aspects of the present invention increase the usefulness of sensing data.

BRIEF DESCRIPTION OF THE DRAWINGS

FIGS. 9A and 9B are diagrams of example selection screens.

DETAILED DESCRIPTION

1. Example Use

Figure 1:
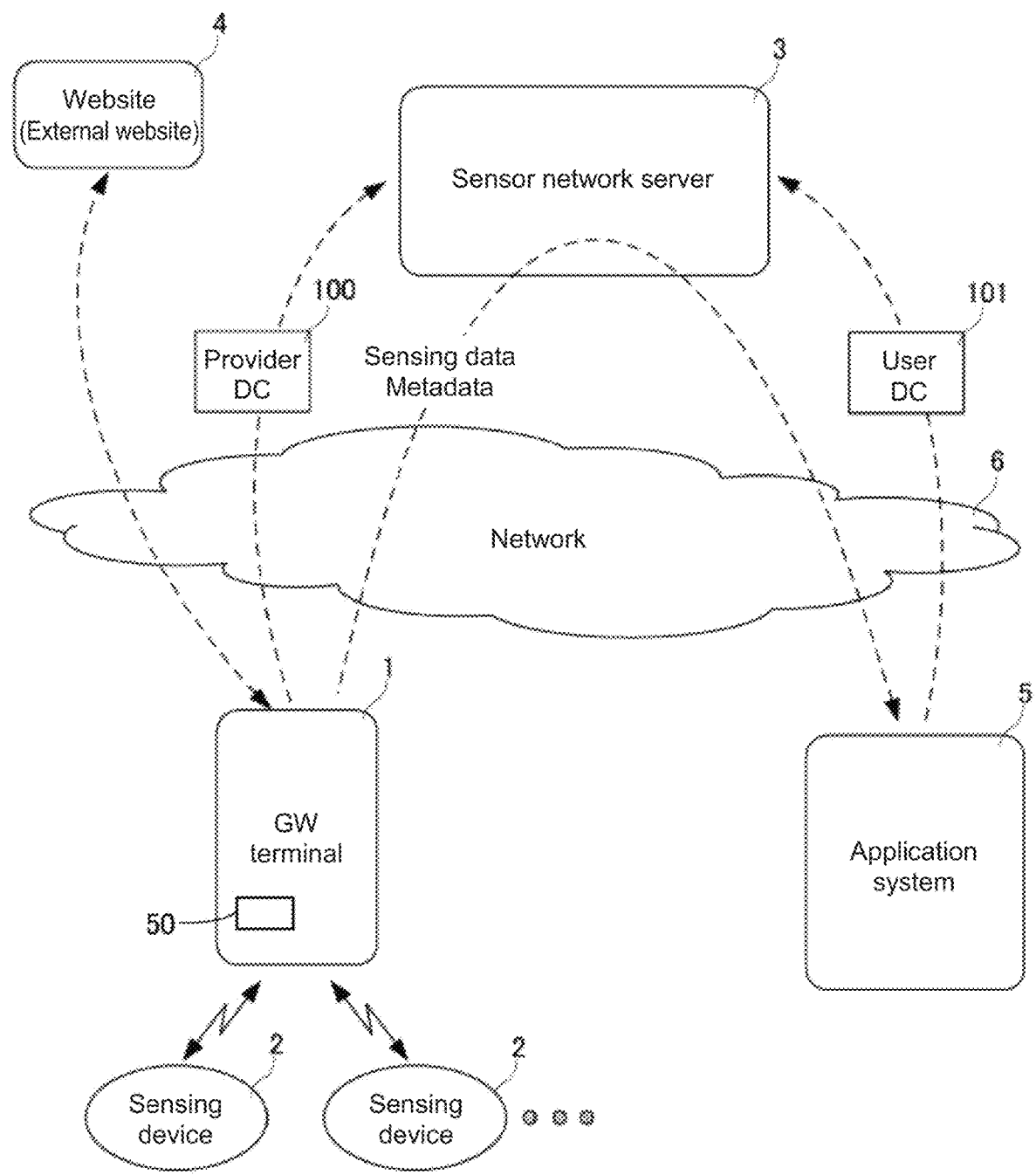
FIG. 1 is a diagram of an example sensing data distribution system.

One or more embodiments of the present invention (hereafter, the present embodiment) will now be described in detail with reference to the drawings. The same or corresponding components in the figures are given the same reference numerals, and will not be described repeatedly. The present embodiment described below is a mere example of the present invention in any aspect. The present embodiment may be variously modified or altered within the scope of the present invention. More specifically, the present invention may be implemented as appropriate using any configuration specific to each embodiment.

FIG. 1 is a diagram describing one implementation of the present invention used in one example situation (sensing data distribution system). The sensing data distribution system distributes sensing data generated by a sensing device (e.g., a sensor) from a data provider to a data user.

As shown in FIG. 1, the sensing data distribution system includes a gateway (GW) terminal 1, an application system 5, and a sensor network server 3. For ease of explanation, the system includes a single GW terminal 1 and a single application system 5 in this embodiment. The system may include multiple GW terminals 1 and multiple application systems 5.

The GW terminal 1 and the application system 5 each include an information communication terminal, such as a smartphone or a personal computer (PC). The GW terminal 1 and the application system 5 each communicate with the sensor network server 3 through a network 6. For example, sensing data is distributed between the GW terminal 1 and the application system 5 through the sensor network server 3.

The GW terminal 1 obtains sensing data generated by sensing devices 2 from the sensing devices 2 with wires or wirelessly. Each sensing device 2 includes one or more sensors, which monitor a target to provide sensing data. In the present embodiment, the GW terminal 1 is operable as a data provider in the sensing data distribution system.

The application system 5 executes an application that uses sensing data. In the present embodiment, the application system 5 is operable as a data user in the sensing data distribution system.

To distribute sensing data, the GW terminal 1 pre-registers a provider data catalog (DC) 100 with the sensor network server 3. The provider DC 100 is a catalog that contains attribute information about the sensing data to be provided to an external device (e.g., the application system 5) from the GW terminal 1. The application system 5 pre-registers a user data catalog (DC) 101 with the sensor network server 3. The user DC 101 is a catalog that contains attribute information about the sensing data intended by the application system 5.

The sensor network server 3 refers to the provider DC 100 and the user DC 101. When the provider DC 100 satisfies a request in the user DC 101 (a request about the attributes of the sensing data intended by the application system 5), the sensor network server 3 transmits a data flow control command to the GW terminal 1. The data flow control command causes sensing data to be distributed from the data provider to the data user.

The GW terminal 1 may transmit sensing data alone to the application system 5 in response to the data flow control command. Without the background of the generated sensing data fully clarified, the sensing data received by the application system 5 (data user) may not be used effectively.

For example, the obtained sensing data may be information about the blood pressure of a person. Without the characteristics of the person (e.g., the height, age, sex, lifestyle pattern, and medication history of taking medicines) clarified, the received blood pressure information may have limited use. For example, the application system 5 cannot analyze the trend on blood pressure based on the characteristics such as the height, age, sex, lifestyle pattern, and medication history.

In the present embodiment, in response to the data flow control command, the GW terminal 1 transmits sensing data and metadata that are associated with each other to the application system 5. The metadata herein represents the background of the generated sensing data with which the metadata is to be associated (e.g., the personal information about the user of the GW terminal 1, hereafter simply referred to as a user).

The GW terminal 1 stores an information collection table 50. As described in detail later, the information collection table 50 defines conditions for obtaining multiple candidate items of metadata that can be associated with sensing data. The GW terminal 1 obtains at least one of the candidate items of metadata in accordance with the conditions defined in the information collection table 50, and associates the obtained metadata items with the sensing data to transmit the associated data sets to the application system 5. The GW terminal 1 selects at least one of the candidate items of metadata in accordance with the conditions in the information collection table 50. Thus, appropriate metadata is associated with the sensing data.

For example, the GW terminal 1 accesses a website 4 in accordance with the conditions in the information collection table 50, and obtains the user's personal information (e.g., the name, age, sex, and address of the user) pre-registered with the website 4 and information about the use history of the website 4 (e.g., information indicating the sales history of products and the delivery history of services when the website 4 is a website for selling products and delivering services). The GW terminal 1 associates, for example, the obtained personal information and use history information with the sensing data, and transmits the associated data sets to the application system 5.

When receiving the sensing data, the application system 5 (data user) can recognize the background of the generated sensing data by referring to the appropriate metadata (e.g., the personal information and the use history information). The sensing data can thus be used effectively. More specifically, the GW terminal 1 increases the usefulness of the sensing data by associating metadata with sensing data.

2. Example Configuration

2-1. Hardware Configuration

Figure 2:
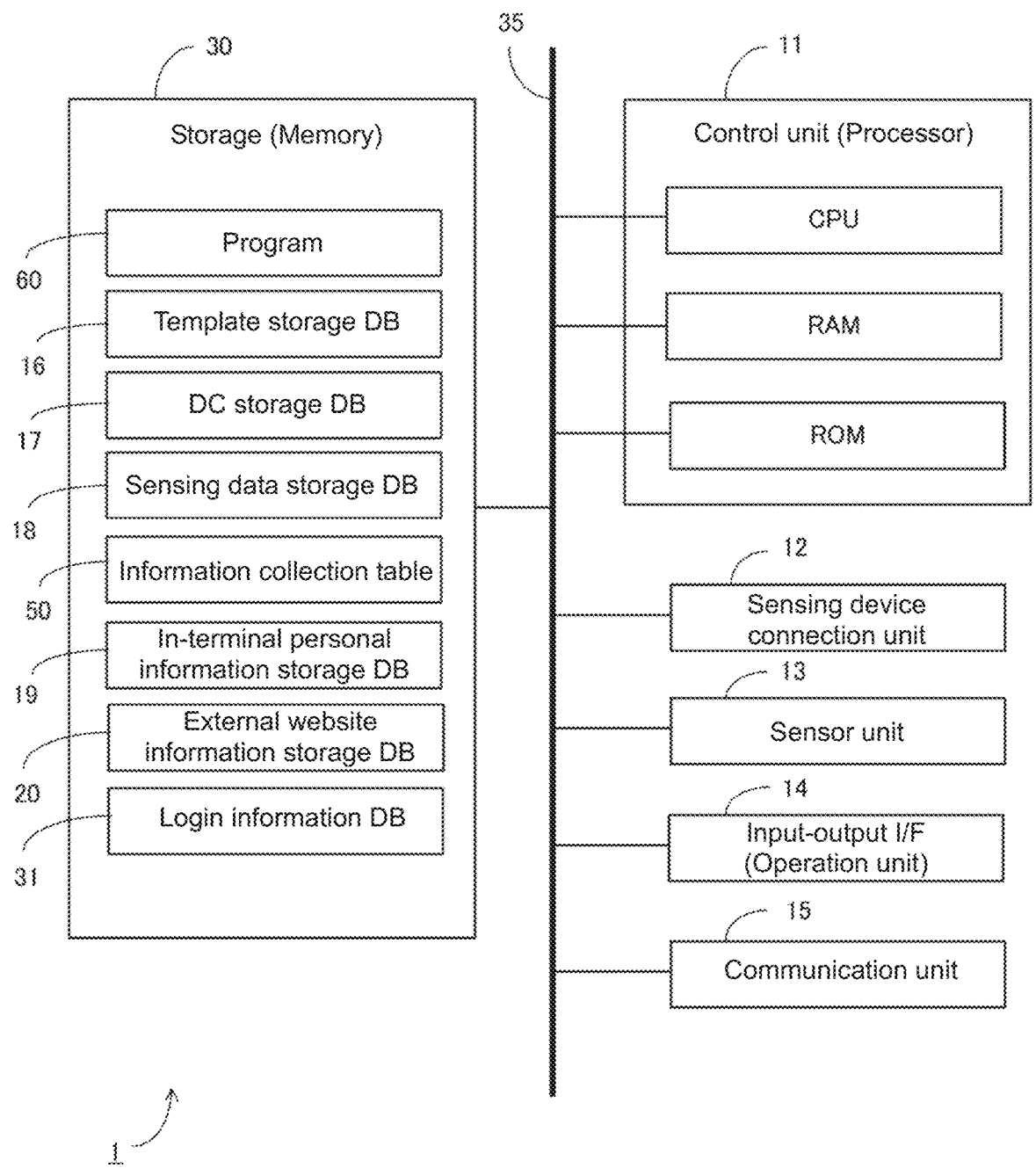
FIG. 2 is a diagram of a gateway (GW) terminal showing its example hardware configuration.

FIG. 2 is a diagram of the GW terminal 1 showing its example hardware configuration. In the present embodiment, the GW terminal 1 is a smartphone.

As shown in FIG. 2, the GW terminal 1 includes a control unit 11, a sensing device connection unit 12, a sensor unit 13, an input-output interface (I/F) 14, a communication unit 15, and a storage 30. These units are electrically connected to one another with a bus 35.

The control unit 11 includes, for example, a central processing unit (CPU), a random access memory (RAM), and a read only memory (ROM). The control unit 11 controls each unit in accordance with intended information processing. The control unit 11 is an example of a processor in an aspect of the present invention. The control unit 11 will be described in detail later.

The sensing device connection unit 12 is connectable to the sensing devices 2 (FIG. 1) with wires or wirelessly. The control unit 11 obtains sensing data generated by the sensing devices 2 through the sensing device connection unit 12.

The sensor unit 13 is a sensor incorporated in the GW terminal 1. The sensor unit 13 may include, for example, a global positioning system (GPS) sensor, a magnetic sensor, and a temperature sensor.

The input-output I/F 14 receives input operations from the user, and outputs (displays) an image. In the present embodiment, the input-output I/F 14 includes, for example, a touch panel installed on a monitor. For example, the user touches an icon appearing on the monitor to operate the GW terminal 1.

The communication unit 15 communicates with external devices external to the GW terminal 1 (e.g., the sensor network server 3, the website 4, and the application system 5) through the network 6 (FIG. 1). The communication unit 15 includes, for example, a wired local area network (LAN) module and a wireless LAN module.

The storage 39 is an auxiliary storage device such as a hard disk drive or a solid state drive. The storage 30 is an example of a memory in an aspect of the present invention. The storage 30 stores, for example, a program 60, a template storage database (DB) 16, a data catalog (DC) storage database (DB) 17, a sensing data storage database (DB) 18, the information collection table 50, an in-terminal personal information storage database (DB) 19, an external website information storage database (DB) 20, and a login information database (DB) 31.

The program 60 is a control program for the GW terminal 1 executable by the control unit 11. The processing performed by the control unit 11 in accordance with the program 60 will be described in detail later.

The template storage DB 16 stores templates for the provider DC 100. The templates for the provider DC 100 are files including a list of attribute information or items of sensing data and attribute information or items of metadata that can be provided to an external device from the GW terminal 1. Some or all of the items contained in the templates are extracted to generate the provider DC 100.

Figures 3, 4:
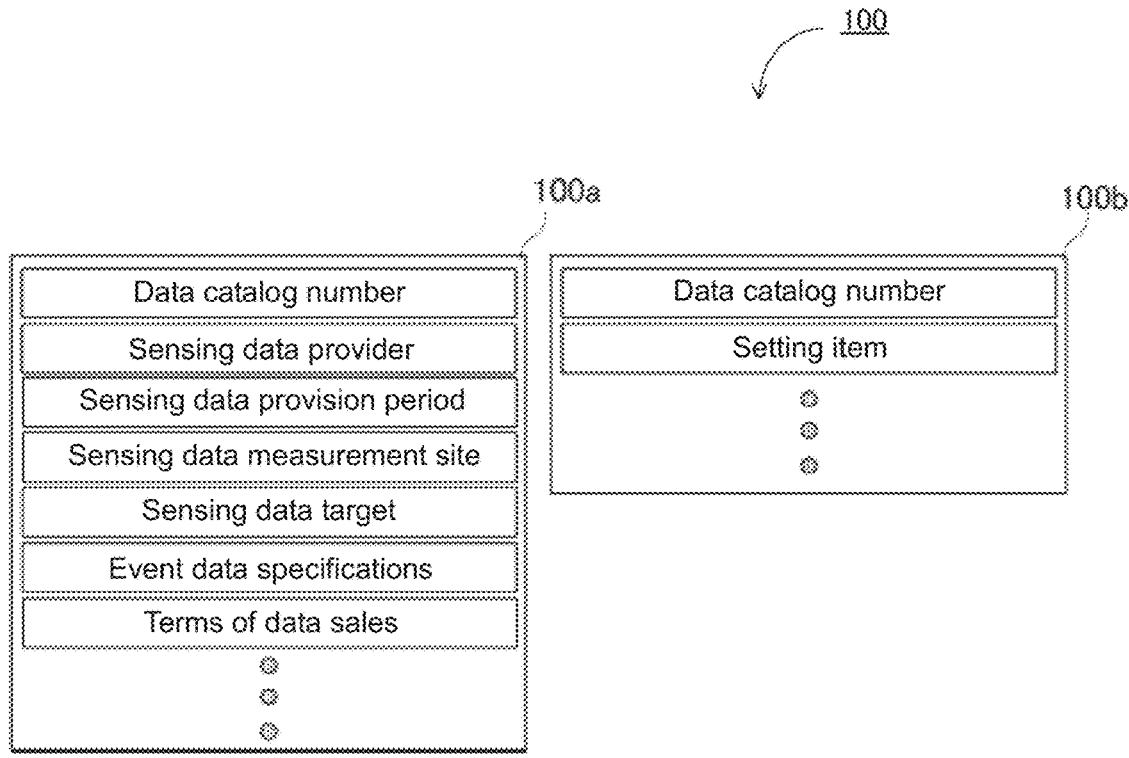
FIG. 3 is a diagram of an example provider data catalog (DC).
FIG. 4 is a diagram of an example information collection table.

FIG. 3 is a diagram of an example of the provider DC 100. As shown in FIG. 3, the provider DC 100 includes a first data catalog 100*a* and a second data catalog 100*b*. The first data catalog 100*a* contains attribute information about the sensing data obtained through the sensing device connection unit 12. The template for the first data catalog 100*a* is obtained by, for example, the sensing device 2 (FIG. 1).

The second data catalog 100*b* contains items of metadata to be associated with the sensing data. As described in detail later, the metadata items to be associated with the sensing data are, for example, preselected (predefined) by the user. The items selected (defined) by the user as the metadata items to be associated with sensing data are also referred to as setting items. The template for the second data catalog 100*b* is obtained from, for example, a website 4 (FIG. 1) or prestored in the template storage DB 16.

The first data catalog 100*a* contains, for example, a data catalog number, a sensing data provider, a sensing data provision period, a sensing data measurement site, a sensing data target, event data specifications, and the terms of data sales.

The data catalog number is used to distinguish the provider DC 100 from other provider data catalogs. The sensing data provider is attribute information representing the organization (an individual or a business entity) providing the sensing data. The sensing data provision period is attribute information representing the period for providing the sensing data. The sensing data measurement site is attribute information representing the site at which the sensing device 2 monitors the target.

The sensing data target is attribute information representing the target and the characteristics monitored by the sensing device 2. The event data specifications are attribute information representing an event condition on which the sensing data is generated by the sensing device 2. The terms of data sales are attribute information representing the conditions on which the sensing data is sold or purchased (e.g., the fee).

The second data catalog 100*b* includes, for example, a data catalog number and setting items. The data catalog number is used to distinguish the provider DC 100 from other provider data catalogs. The first data catalog 100*a* and the second data catalog 100*b* included in the same provider DC 100 are given the same data catalog number. More specifically, the first data catalog 100*a* and the second data catalog 100*b* included in the same provider DC 100 are associated with each other with the data catalog number.

As described above, the setting items are selected by the user as metadata items to be associated with the sensing data. When the user selects multiple items, the second data catalog 100*b* includes multiple setting items. For example, metadata items selected to be associated with the sensing data may be use history information about a website 4 and the age and sex of the user. In this case, the second data catalog 100*b* contains the use history information and the age and sex, in addition to the data catalog number.

Referring back to FIG. 2, the DC storage DB 17 stores the data catalog generated based on the templates. The DC storage DB 17 stores, for example, the data catalog registered with the sensor network server 3. The sensing data storage DB 18 stores the sensing data generated by the sensing devices 2 or the sensor unit 13.

The sensing data generated by the sensor unit 13 is also used as metadata to be associated with the sensing data generated by a sensing device 2. Thus, the sensing data generated by the sensing device 2 can be associated with information indicating the background of the obtained sensing data (the sensing data generated by the sensor unit 13). Such background information cannot be obtained by the sensing device 2 alone.

The information collection table 50 contains a list of items of sensing data (monitoring characteristics) that can be transmitted to an external device from the GW terminal 1 and a list of items of metadata (setting items) that can be transmitted in a manner associated with the sensing data from the GW terminal 1. The information collection table 50 is an example of obtaining condition information in an aspect of the present invention.

FIG. 4 is a diagram of an example of the information collection table 50. As shown in FIG. 4, the information collection table 50 contains candidate items of sensing data (monitoring characteristics) that can be transmitted to an external device and candidate items of metadata (setting items) that can be transmitted to an external device in a manner associated with the sensing data.

The information collection table 50 contains information about the availability (either available or not available) of the personal information (personal information from which the user can be identified in this example) for each monitored characteristic and each setting item. For example, the monitored characteristic with no personal information is labeled Not available in the personal information in the information collection table 50. For example, the setting item with the personal information is labeled Available in the personal information in the information collection table 50.

The information collection table 50 also includes information indicating the time to collect each monitored characteristic and each setting item. The collection time refers to the time at which the GW terminal 1 obtains external data or internal data. For example, the collection time at which a metadata item is obtained from a website 4 (external website) is the time at which the GW terminal 1 accesses the website 4.

In the example shown in FIG. 4, a website 4 named AAA (external website) is accessed at 0:00 am every Monday to obtain the use history information about the website 4. As described above, the information collection table 50 at least defines the conditions for obtaining candidate items of metadata to be associated with sensing data.

The in-terminal personal information storage DB 19 stores the personal information registered with the GW terminal 1 by the user. The personal information stored in the in-terminal personal information storage DB 19 corresponds to, for example, the items contained in Registered data (Name) in the information collection table 50. The personal information stored in the in-terminal personal information storage DB 19 includes, for example, the name, height, weight, age, sex, and address book.

The external website information storage DB 20 stores, for example, the user's personal information and information about the use history of the website 4 obtained from the website 4. The information stored in the external website information storage DB 20 is, for example, information corresponding to the setting items included in External website in the information collection table 50. More specifically, the information stored in the external website information storage DB 20 is obtained from websites 4 (external websites) in accordance with, for example, the collection times defined in the information collection table 50.

The login information DB 31 stores login information to log in each website 4 (external website). The login information includes, for example, login identification (ID) and a login password. When the GW terminal 1 obtains the personal information or other information items from a website 4 requesting a login ID and a login password, the corresponding login ID and login password stored in the login information DB 31 are used.

2-2. Functional Configuration

Figure 5:
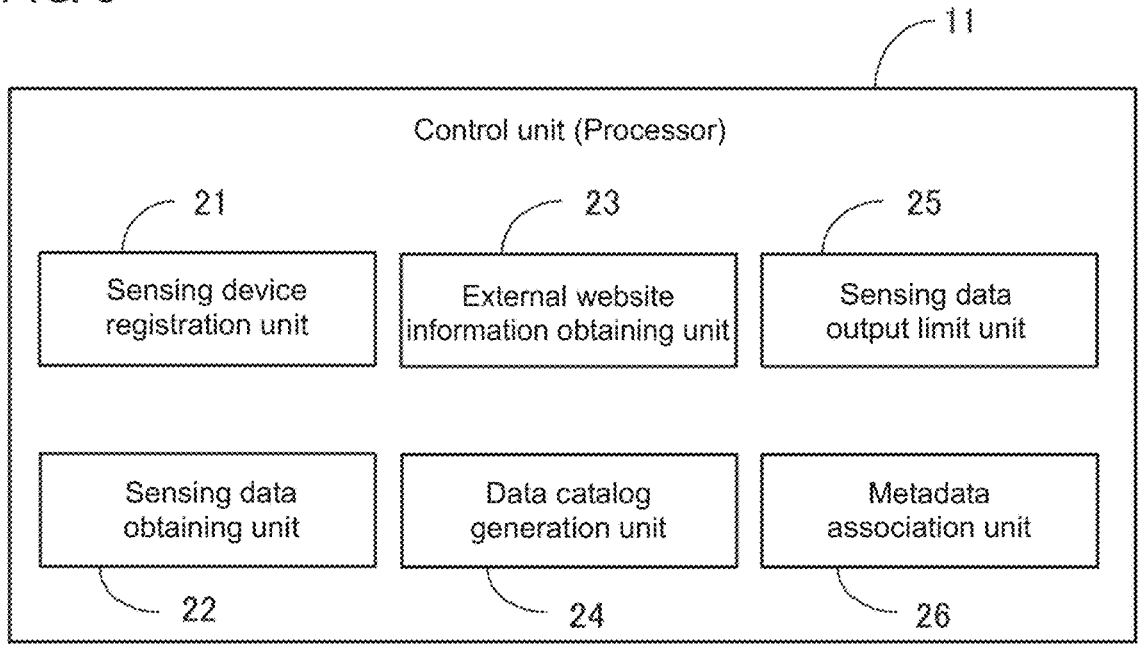
FIG. 5 is a diagram of a control unit showing its example functional configuration.

FIG. 5 is a diagram of the control unit 11 showing its example functional configuration. The control unit 11 expands the program 60 stored in the storage 30 into the RAM. The CPU in the control unit 11 then interprets and executes the program 60 expanded in the RAM to control each unit. As shown in FIG. 5, the control unit 11 thus operates as a sensing device registration unit 21, a sensing data obtaining unit 22, an external website information obtaining unit 23, a data catalog generation unit 24, a sensing data output limit unit 25, and a metadata association unit 26.

The sensing device registration unit 21 registers the device identifier of a sensing device 2 with the GW terminal 1. The device identifier is information indicating the type of the sensing device 2. Once the device identifier is registered, the sensing device 2 corresponding to the registered device identifier is added to the information collection table 50. The GW terminal 1 can distribute, in the sensing data distribution system (FIG. 1), the sensing data generated by the sensing device 2 having the registered device identifier. The procedure for registering a sensing device 2 will be described in detail later.

The sensing data obtaining unit 22 obtains sensing data from the sensing device 2 through the sensing device connection unit 12. The sensing data obtaining unit 22 also obtains sensing data from the sensor unit 13. The sensing data obtaining unit 22 stores the obtained sensing data into the sensing data storage DB 18 (FIG. 2).

The external website information obtaining unit 23 accesses a website 4 through the communication unit 15, and obtains, for example, the user's personal information and information about the use history of the website 4 from the website 4. When the website 4 requests a login ID and a login password, the external website information obtaining unit 23 uses the corresponding login ID and login password stored in the login information DB 31 (FIG. 2). The external website information obtaining unit 23 stores information obtained from the website 4 into the external website information storage DB 20.

The data catalog generation unit 24 generates the provider DC 100 based on the templates stored in the template storage DB 16 (FIG. 2). The provider DC 100 generated by the data catalog generation unit 24 is registered with the sensor network server 3 and stored in the DC storage DB 17 (FIG. 2). The procedure for generating the provider DC 100 will be described in detail later.

The sensing data output limit unit 25 filters sensing data for transmission through the communication unit 15. More specifically, the sensing data output limit unit 25 classifies sensing data into sensing data allowed to be transmitted to an external device and sensing data not allowed to be transmitted to an external device.

The metadata association unit 26 associates metadata with the sensing data to be transmitted to an external device. The items of metadata to be associated with the sensing data are preselected by the user. For example, the user selects at least one of the candidate items of metadata stored in the in-terminal personal information storage DB 19 and the external website information storage DB 20.

3. Operation Examples

An example operation of each unit (example data flow) in the entire sensing data distribution system will first be described, and then the operation of the GW terminal 1 will be described.

3-1. Operation Example of Entire System

Figure 6:
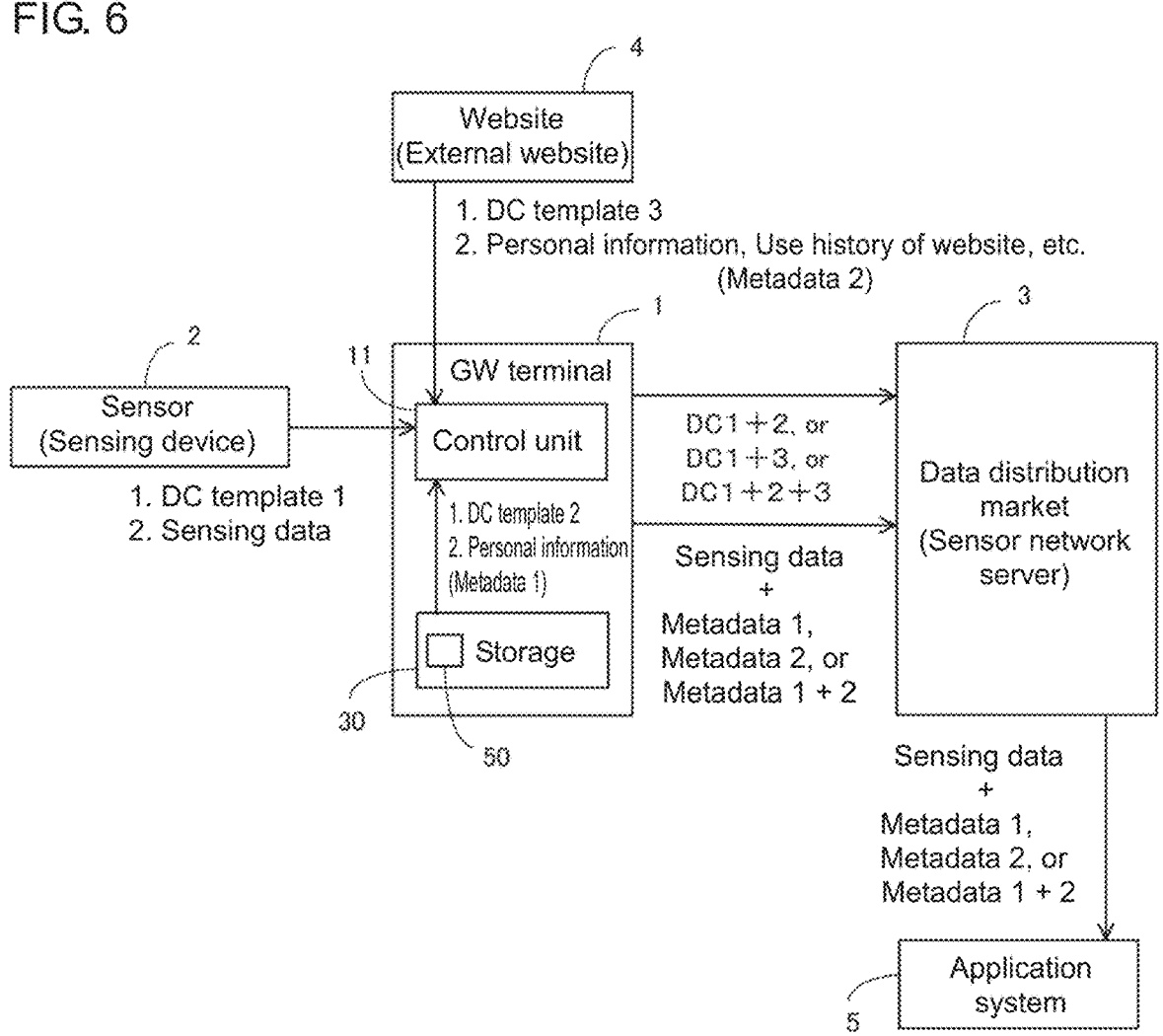
FIG. 6 is a diagram describing an example data flow in the sensing data distribution system.

FIG. 6 is a diagram describing an example data flow in the sensing data distribution system. As shown in FIG. 6, a sensing device 2 stores the template for a data catalog (DC template 1) listing monitoring characteristics obtained by the sensing device 2, The storage 30 and a website 4 each store the template for a data catalog (DC template 2, DC template 3) listing items of metadata held by the storage 30 or the website 4.

The control unit 11 in the GW terminal 1 obtains the DC template 1 from the sensing device 2, the DC template 2 from the storage 30, and the DC template 3 from the website 4. The control unit 11 extracts the items preselected by the user (more specifically, items selected as distributable data) from each template, and generates a data catalog (DC). The control unit 11 registers the generated data catalog with the sensor network server 3.

The control unit 11 obtains sensing data from the sensing device 2, metadata 1 from the storage 30, and metadata 2 from the website 4 in accordance with the conditions defined in the information collection table 50. This allows for collection of data items corresponding to the items contained in the data catalog registered with the sensor network server 3. The GW terminal 1 associates the metadata items and the sensing data included in the data catalog with each other, and transmits the associated data sets to the sensor network server 3. The sensor network server 3 transmits the received data sets to the application system 5. This completes the data distribution from the GW terminal 1 to the application system 5.

The sensing data is received together with appropriately associated items of metadata selected from multiple candidate items of metadata. The application system 5 can thus more accurately determine the background of the generated sensing data by referring to the metadata.

For example, when the associated metadata includes the user's personal information obtained from the website 4, the application system 5 can accurately determine the background of the generated sensing data by referring to the user's personal information. For example, when the associated metadata includes the information about the use history of the website 4 obtained from the website 4, the application system 5 can accurately determine the background of the generated sensing data by referring to the use history of the website 4 by the user (e.g., the history of purchasing products through the website 4 and the history of receiving services through the website 4). Thus, the application system 5 can more accurately conduct analysis or other processes using the sensing data.

3-2. Operation Example of GW Terminal

The operations of the GW terminal 1 will now be described.

3-2-1. Registering Sensing Device

Figure 7:
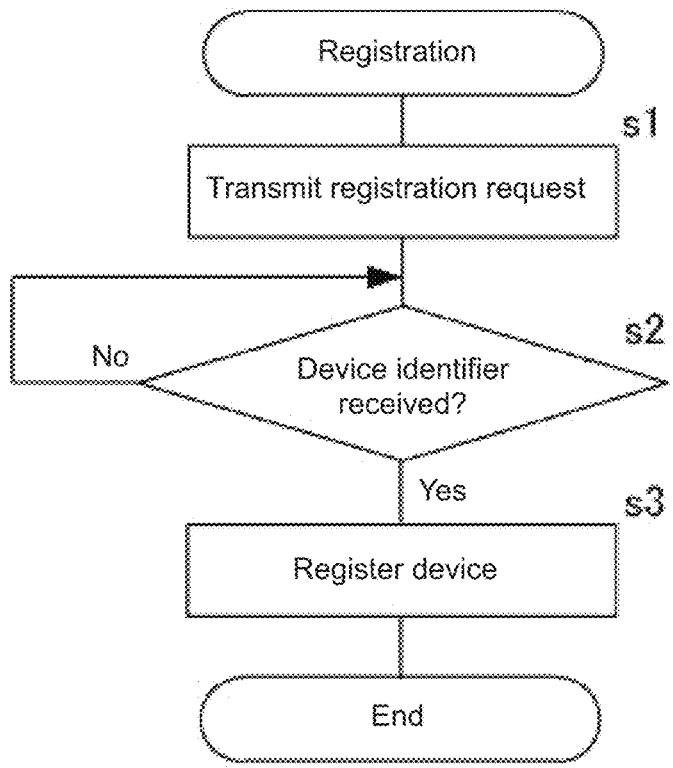
FIG. 7 is a flowchart showing an example procedure for registering a sensing device.

FIG. 7 is a flowchart showing an example procedure for registering a sensing device 2. The processing shown in the flowchart is performed by the control unit 11 (sensing device registration unit 21) in response to, for example, an instruction to register a sensing device 2 provided from the user through the input-output I/F 14.

As shown in FIG. 7, the control unit 11 transmits a registration request signal to the sensing device 2 connected to the sensing device connection unit 12 (step s1). In response to the registration request signal received from the GW terminal 1, the sensing device 2 transmits the device identifier and the DC template to the GW terminal 1. The device identifier and the DC template are stored in the internal memory of the sensing device 2.

The control unit 11 determines whether the device identifier and the DC template are received from the sensing device 2 (step s2). When determining that the device identifier and the DC template are not received (No in step s2), the control unit 11 repeats the processing in step s2.

When determining that the device identifier and the DC template are received (Yes in step s2), the control unit 11 stores the received DC template into the template storage DB 16 and performs the device registration based on the device identifier (step s3). The device registration is performed by the control unit 11 adding the sensing device 2 corresponding to the device identifier to the information collection table 50 (FIG. 4). This completes the device registration.

3-2-2. Generating Provider Data Catalog

Figure 8:
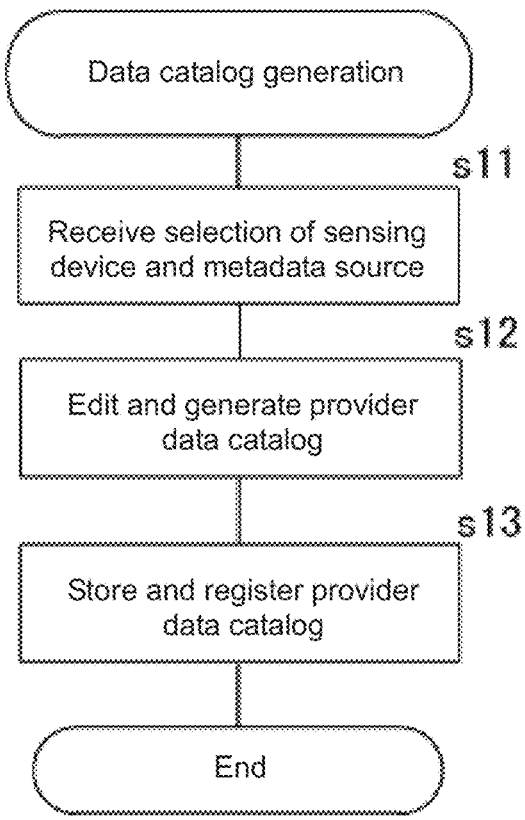
FIG. 8 is a flowchart showing an example procedure for generating the provider DC.

FIG. 8 is a flowchart showing an example procedure for generating the provider DC 100. The processing shown in the flowchart is performed by the control unit 11 (data catalog generation unit 24) in response to, for example, an instruction to generate the provider DC 100 provided from the user through the input-output I/F 14.

As shown in FIG. 8, the control unit 11 receives selection of the sensing device 2 that generates the sensing data to be provided and selection of the source of the metadata to be associated with the sensing data (step s11). More specifically, the control unit 11 receives the selection through a selection screen appearing on the input-output I/F 14.

FIGS. 9A and 9B are diagrams of example selection screens. As shown in FIG. 9A, the input-output I/F 14 shows multiple options. For example, the upper two options (Environmental sensor XXX and Blood pressure sensor YYY) are the sensing devices for generating sensing data. The lower five options (GPS sensor, External website AAA, External website BBB, External website CCC, and more options) are the sources of metadata that can be associated with the sensing data.

In this example, the blood pressure sensor YYY and the external website AAA are selected. More specifically, the sensing data sensed by the blood pressure sensor YYY and the metadata obtained from the external website AAA are selected as data to be provided. As shown in FIG. 9B, edit buttons 73 and 74 appear on the right of the selected options (Blood pressure sensor YYY and External website AAA).

Referring back to FIG. 8, after the selection is performed in step s11 and then an edit button (e.g., the edit button 73 or 74) is touched (operated), the control unit 11 advances to an edit and generation process for the provider data catalog corresponding to the touched edit button (step s12).

For example, when an edit button corresponding to the sensing device 2 is touched, the control unit 11 allows an edit and generation process for the first data catalog 100a (FIG. 3). For example, when an edit button corresponding to the source of metadata is touched, the control unit 11 allows an edit and generation process for the second data catalog 100b (FIG. 3). The provider data catalog is edited and generated based on an instruction from the user provided through the edit screen appearing on the input-output I/F 14.

Figure 10A:
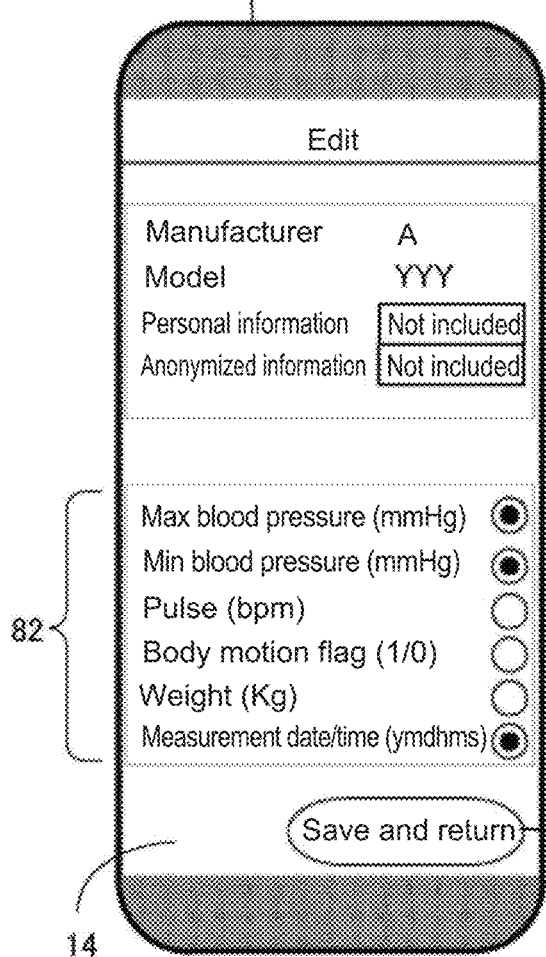
FIGS. 10A and 10B are diagrams of example edit screens for editing the provider DC.
Figure 10B:
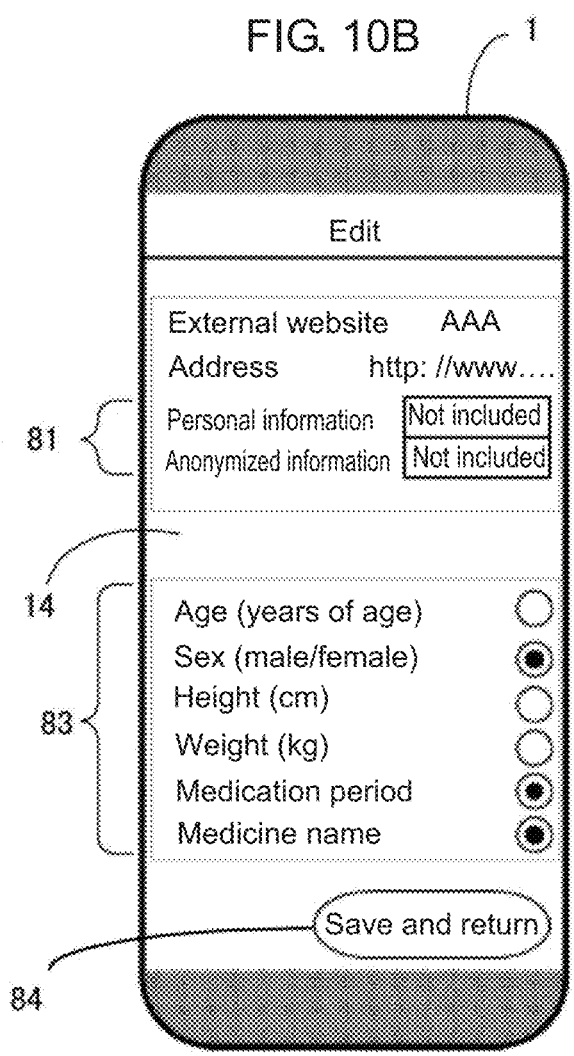

FIGS. 10A and 10B are diagrams of example edit screens for editing the provider data catalog. FIG. 10A is an edit screen that appears when the edit button 73 is touched (an edit screen for editing the first data catalog 100a). FIG. 10B is an edit screen that appears when the edit button 74 is touched (an edit screen for editing the second data catalog 100b). These edit screens are generated each by reading the DC template corresponding to the edit target from the template storage DB 16.

As shown in FIG. 10A, the input-output I/F 14 shows setting fields 81 and 82 and an enter button 84 (Save and return), in addition to the manufacturer and the model of the blood pressure sensor YYY. The setting field 82 is used to select items of sensing data to be provided to the user (e.g., the application system 5). Each option has a checkbox. The user touches (operates) the checkboxes to select sensing data items to be provided to the user. In this embodiment, the sensing data items selected for provision to the user are the maximum blood pressure, minimum blood pressure, and measurement date and time (in other words, the sensing data items unselected for provision to the user are the pulse, body motion flag, and weight).

The setting field 81 is used to set whether the personal information and anonymized information are to be included in the data provided to the user. In the setting field 81, Included or Not included can be switched. The personal information herein refers to information from which the user can be identified (e.g., the name and the address). The anonymized information refers to information from which the user cannot be identified, and is generated by anonymizing the personal information from which the user can be identified. The user can set either Included or Not included for the personal information and for the anonymized information after determining whether the personal information and the anonymized information are to be included in the data provided to the user. The structure according to the present embodiment thus prevents the personal information and the anonymized information from leaking when unintended by the user.

In the present embodiment, the setting about the personal information and the anonymized information for the sensing data also applies to the personal information and the anonymized information for the metadata. More specifically, when Not included is set for the personal information for the sensing data, the same setting, Not included, automatically applies to the personal information for the metadata.

As shown in FIG. 10B, the input-output I/F 14 shows setting fields 81 and 83 and the commit button 84 (Save and return), in addition to the name of the external website AAA and its address. The setting field 81 is the same as the setting field 81 described with reference to FIG. 10A. The setting field 83 is used to select items of metadata to be associated with the sensing data to be provided to the user. Each option has a checkbox. The user touches the checkboxes to select metadata items to be associated with the sensing data. In this example, the metadata items selected to be associated with the sensing data are the sex, medication period, and name of the medicine (in other words, the metadata items unselected for provision to the user are the age, height, and weight). In the present embodiment, the user can select appropriate metadata items to be associated with the sensing data to be provided to the user.

In response to a touch on the enter button 84 (Save and return), the input-output I/F 14 returns to the screen shown in FIG. 9B. Referring again to FIG. 9B, in response to a touch on an enter button 75 (Next), the input-output I/F 14 shows a screen for editing the terms of sales for the sensing data.

Figure 11:
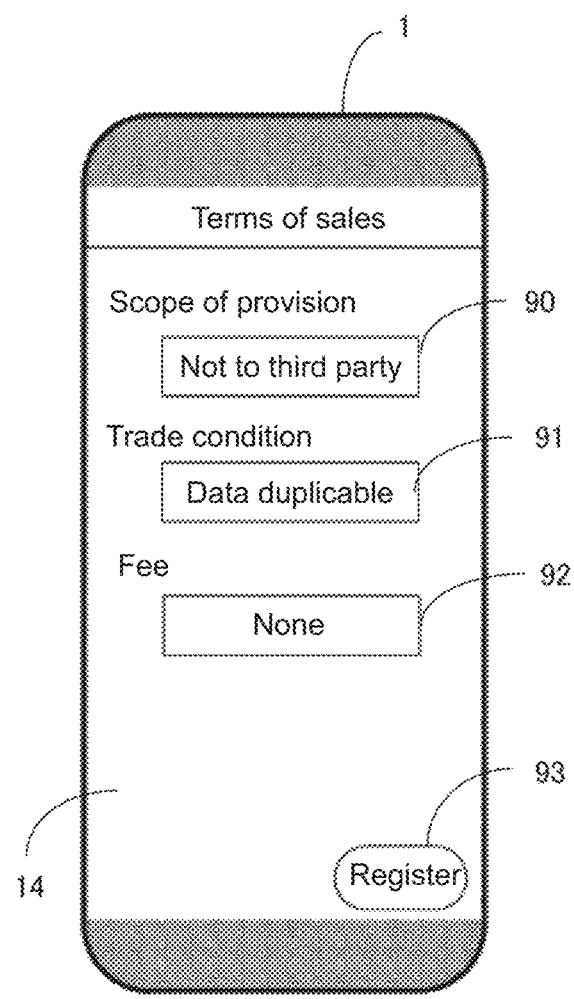
FIG. 11 is a diagram of an example edit screen for editing the terms of sales.

FIG. 11 is a diagram of an example edit screen for editing the terms of sales. As shown in FIG. 11, the input-output I/F 14 shows setting fields 90, 91, and 92, and an enter button 93 (Register), The setting field 90 is used to set the range in which the data can be used. The setting field 90 allows selection of an appropriate option. The setting field 91 is used to set a trade condition for the data. The setting field 91 allows selection of an appropriate option. The setting field 92 is used to set the data fee. The setting field 92 allows selection of an appropriate option.

When the enter button 93 is touched, the edit to the provider data catalog ends. The control unit 11 then associates the edited first data catalog 100a and the edited second data catalog 100b with each other to generate the provider DC 100. The control unit 11 associates the first data catalog 100a and the second data catalog 100b by assigning the same data catalog number to the first data catalog 100a and the second data catalog 100b.

Referring back to FIG. 8, after the provider data catalog is edited to generate the provider DC 100, the control unit 11 stores the generated provider DC 100 into the DC storage DB 17, and controls the communication unit 15 to transmit the provider DC 100 to the sensor network server 3. This registers the provider DC 100 with the sensor network server 3 (step s13).

3-2-3. Collecting Data

Figure 12:
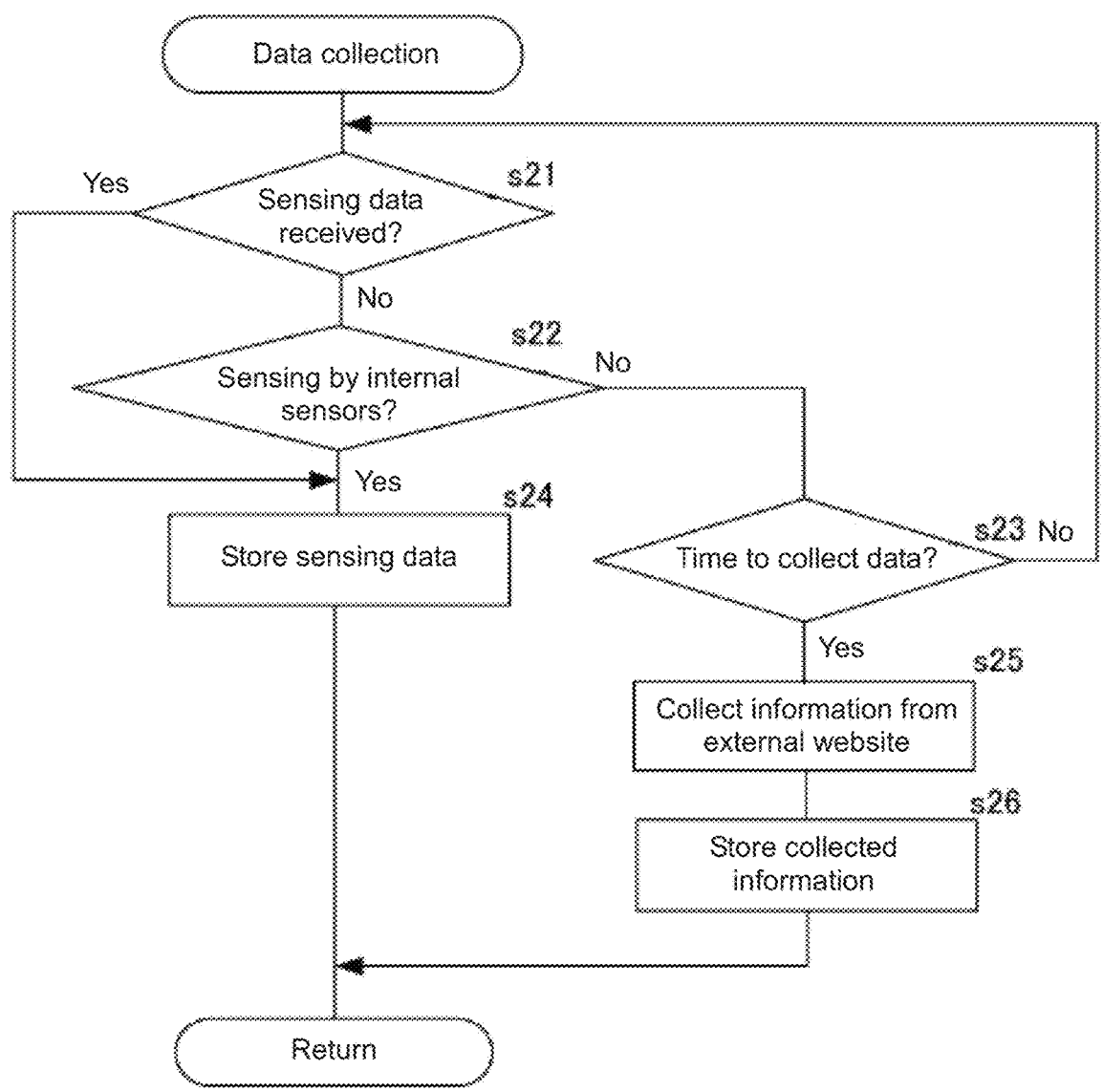
FIG. 12 is a flowchart showing an example procedure for collecting different types of data.

FIG. 12 is a flowchart showing an example procedure for collecting each type of data (sensing data and metadata). The processing in the flowchart is repeated by the control unit 11 (the sensing data obtaining unit 22 and the external website information obtaining unit 23) while, for example, the GW terminal 1 is operating.

As shown in FIG. 12, the control unit 11 determines whether sensing data is received through the sensing device connection unit 12 (step s21). When determining that the sensing data is received (Yes in step s21), the control unit 11 stores the received sensing data into the sensing data storage DB 18 (step s24).

When determining that the sensing data is not received (No in step s21), the control unit 11 determines whether sensing data is received from the sensor unit 13 (an internal sensor) (step s22). When determining that the sensing data is received (Yes in step s22), the control unit 11 stores the received sensing data into the sensing data storage DB 18 (step s24).

When determining that the sensing data is not received (No in step s22), the control unit 11 refers to the information collection table 50 (FIG. 4) to determine whether the current time is the time to collect metadata (step s23). When determining that the current time is not the time to collet metadata (No in step s23), the processing returns to step s21.

When determining that the current time is the time to collect metadata (Yes in step s23), the control unit 11 accesses the website 4 in accordance with the conditions defined in the information collection table 50, and obtains candidate items of metadata (step s25). When the website 4 requests a login ID and a login password, the control unit 11 uses the corresponding login ID and the login password stored in the login information DB 31. The structure according to the present embodiment thus allows the control unit 11 to obtain the candidate items of metadata (e.g., the user's personal information and the use history of the website 4) stored in the website 4 that requests login information.

The control unit 11 stores the obtained metadata into the external website information storage DB 20 (step s26). The control unit 11 repeats the processing in step s21 to step s26 to obtain sensing data and metadata.

3-2-4, Providing Sensing Data

Figure 13:
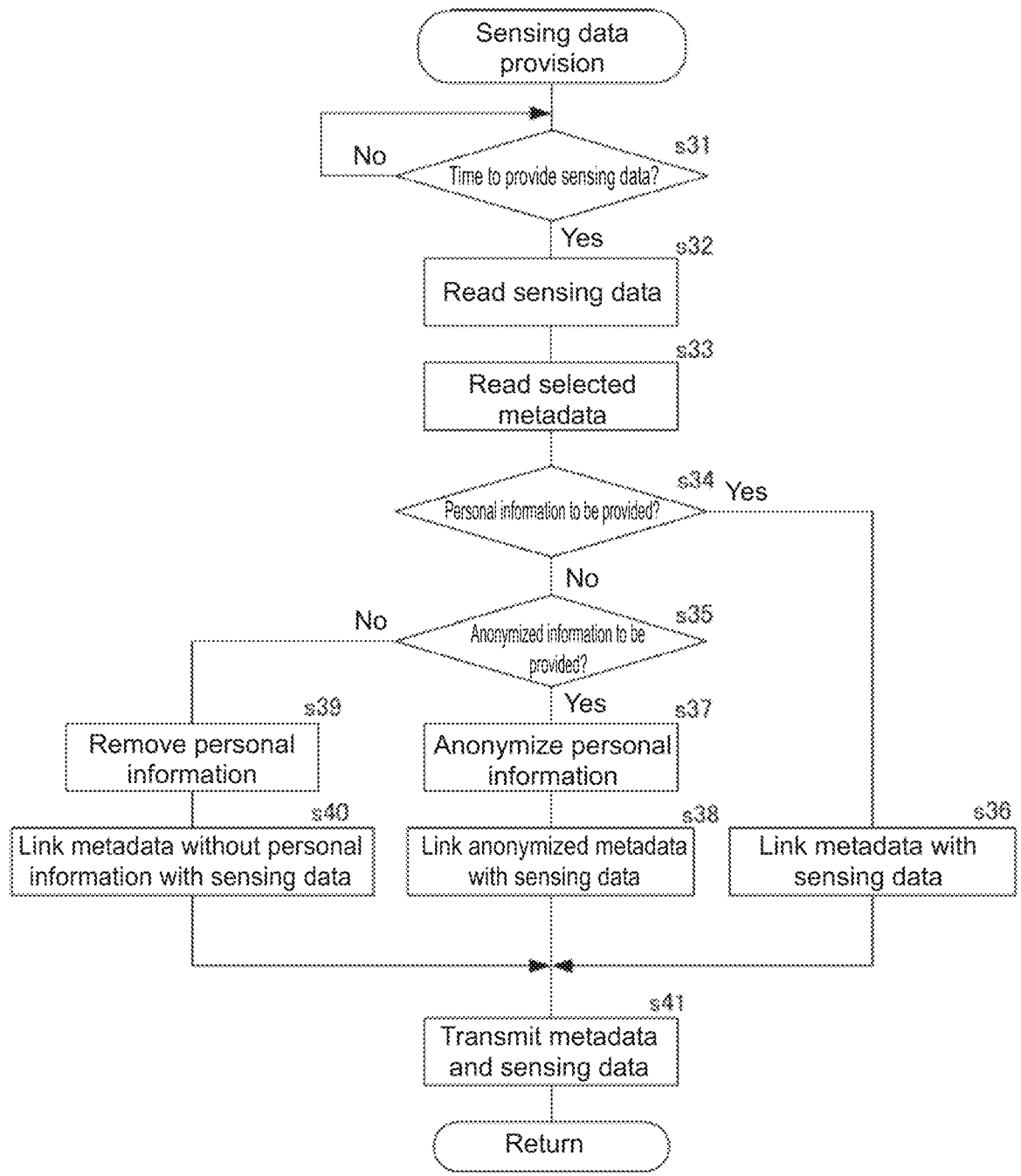
FIG. 13 is a flowchart showing an example procedure for providing sensing data to a user.

FIG. 13 is a flowchart showing a procedure for providing sensing data to a user. The processing in the flowchart is repeated by the control unit 11 (the sensing data output limit unit 25 and the metadata association unit 26) while, for example, the GW terminal 1 is operating.

As shown in FIG. 13, the control unit 11 determines whether the current time is the time to provide sensing data to a user (step s31). The time includes, for example, when the sensing device 2 generates new sensing data, when the provider DC 100 is revised, when a request for sensing data is provided by the user, and predetermined times.

When determining that the current time is not the time to provide sensing data (No in step s31), the control unit 11 repeats the processing in step s31. When determining that the current time is the time to provide sensing data (Yes in step s31), the control unit 11 reads, from the sensing data storage DB 18, the sensing data representing the monitoring characteristics selected for provision in the provider DC 100 (first data catalog 100a) (step s32). In other words, the sensing data representing the monitoring characteristics unselected in the provider DC 100 is not read from the sensing data storage DB 18.

The control unit 11 then reads, from the in-terminal personal information storage DB 19 and the external website information storage DB 20, the metadata to be associated with the sensing data to be provided (step s33). When the selected metadata includes sensing data generated by the sensor unit 13, this sensing data is read from the sensing data storage DB 18. More specifically, the control unit 11 reads, from the storage 30, the metadata selected for provision in the provider DC 100 (second data catalog 100b) and does not read unselected metadata.

The control unit 11 then refers to the provider DC 100 to determine whether the personal information from which the user can be identified is set for provision to the user (step s34), More specifically, the control unit 11 checks the setting selected in the setting field 81 (FIGS. 10A and 10B) in the provider DC 100 to determine whether the personal information is set for provision to the user. When determining that the personal information from which the user can be identified is set for provision to the user (Yes in step s34), the control unit 11 associates (links) the metadata read in step s33 directly with the sensing data read in step s32 (step s36).

When determining that the personal information from which the user can be identified is not set for provision to the user (No in step s34), the control unit 11 refers to the provider DC 100 to determine whether the user-unidentified anonymized information is set for provision to the user (step s35). More specifically, the control unit 11 checks the setting selected in the setting field 81 in the provider DC 100 to determine whether the anonymized information is set for provision to the user.

When determining that the anonymized information is set for provision to the user (Yes in step s35), the control unit 11 anonymizes the personal information (identifying the user) read in steps s32 and s33 (step s37). The control unit 11 associates (or links) the metadata including the anonymized information generated in step s37 with the sensing data including the anonymized information generated in step s37 (step s38).

When determining that anonymized information is not set for provision to the user (No in step s35), the control unit 11 removes (or deletes) the personal information (identifying the user) from the sensing data read in step s32 and from the metadata read in step s33 (step s39). The control unit 11 associates (or links) the metadata (without the personal information) generated in step s39 with the sensing data generated in step s39 (step s40).

The control unit 11 transmits the sensing data and the metadata associated with the sensing data to the sensor network server 3 (step s41). In the present embodiment, the personal information from which the user can be identified may be directly associated with the sensing data, the anonymized personal information may be associated with the sensing data, or information from which personal information identifying the user is deleted may be associated with the sensing data, depending on the setting selected by the user. The GW terminal 1 according to the present embodiment thus reduces the leakage of the personal information identifying the user when unintended by the user.

The control unit 11 repeats the processing in step s31 to step s41 to transmit the sensing data and the metadata to the application system 5 at appropriate times through the sensor network server 3.

4. Features

As described above, the control unit 11 included in the GW terminal 1 according to the present embodiment obtains at least one of the multiple candidate items of metadata in accordance with the conditions defined in the information collection table 50, and associates the obtained metadata with the sensing data to transmit the associated data sets to the application system 5, The GW terminal 1 selects at least one of the candidate items of metadata in accordance with the conditions in the information collection table 50. Thus, appropriate metadata is associated with the sensing data.

When receiving the sensing data, the application system 5 (data user) can recognize the background of the generated sensing data by referring to the appropriate metadata (e.g., the personal information and the use history information). The sensing data can thus be used effectively.

When, for example, artificial intelligence (AI) is trained using sensing data, Al cannot be trained effectively using learning data with many inappropriate data sets. The inappropriate data sets can be removed preliminarily from the learning data based on the metadata associated with the sensing data, thug generating a group of appropriate learning data sets. AI is then trained using such learning data and become more effective.

More specifically, the GW terminal 1 increases the usefulness of the sensing data by associating metadata with sensing data.

5. Modifications

Although the invention has been described based on the embodiment, the embodiment may be modified variously without departing from the sprit and scope of the present invention. Such modifications will now be described. The modifications described below may be combined as appropriate.

5-1.

In the above embodiment, the GW terminal 1 collects all the candidate items of metadata in accordance with the conditions defined in the information collection table 50, independently of whether the metadata item is included in the provider DC 100 as a setting item. The metadata items may be collected in different manners. For example, the GW terminal 1 may simply collect metadata items included in the provider DC 100 as setting items in accordance with the conditions defined in the information collection table 50. This structure uses less channel capacity for downloading metadata than the structure for collecting all the metadata items.

5-2.

In the above embodiment, the sensing data and the metadata have the same setting either to or not to include the personal information and the anonymized information. The sensing data and the metadata may have different settings to or not to include the personal information and the anonymized information. In this case, the determination to or not to include the personal information and the anonymized information in the data for provision to the user is performed separately for the sensing data and for the metadata.

5-3.

In the above embodiment, the provider DC 100 registered with the sensor network server 3 includes the first data catalog 100*a* and the second data catalog 100*b*. The provider DC 100 registered with the sensor network server 3 may include either the first data catalog 100*a* or the second data catalog 100*b*. For example, the provider DC 100 registered with the sensor network server 3 may include the first data catalog 100*a* alone, although the metadata items to be associated with the sensing data are selected.

5-4.

In the above embodiment, the sensor network server 3 generates the data flow control command. The data flow control command may be generated by another component rather than the sensor network server 3. For example, the GW terminal 1 or the application system 5 may generate the data flow control command.

5-5.

In the above embodiment, the sensing data and the metadata are transmitted to the application system 5 from the GW terminal 1 through the sensor network server 3. The data flow may be different from the data flow described above. For example, the sensing data and the metadata may be transmitted to the application system 5 directly from the GW terminal 1.

5-6.

In the above embodiment, the GW terminal 1 includes the sensor unit 13. The GW terminal 1 may eliminate the sensor unit 13.

5-7.

In the above embodiment, the provider DC 100 includes the first data catalog 100*a* and the second data catalog 100*b*. The provider DC 100 may have other structures. For example, the provider DC 100 may include a single data catalog describing the items to be included in the first data catalog 100*a* and the second data catalog 100*b*.

5-8.

In the above embodiment, the provider DC 100 registered with the sensor network server 3 is stored in the DC storage DB 17. However, another provider DC 100 may be stored in the DC storage DB 17. For example, a provider DC 100 unregistered with the sensor network server 3 may be stored in the DC storage DB 17.

5-9.

In the above embodiment, the information collection table 50 stores the conditions for obtaining multiple candidate items of metadata associated with sensing data. However, the conditions for obtaining such candidate items of metadata may be managed collectively in any forms other than a table.

5-10.

In the above embodiment, the sensing device 2 stores the template for the first data catalog 100*a*. The sensing device 2 may not store the template for the first data catalog 100*a*, For example, the sensing device 2 may store a uniform resource locator (URL) on the Internet storing the template for the first data catalog 100*a*. In this case, the control unit 11 (sensing device registration unit 21) may obtain the URL storing the template for the first data catalog 100*a* from the sensing device 2, and access the URL to obtain the template for the first data catalog 100*a*.

For example, the sensing device 2 may store a digital object identifier (DOI) identifying the template for the first data catalog 100*a*, In this case, the control unit 11 (sensing device registration unit 21) may obtain the DOI from the sensing device 2, and access the obtained DOI to obtain the template for the first data catalog 100*a*.

5-11.

In the above embodiment, the GW terminal 1 receives sensing data from a sensing device 2 through the sensing device connection unit 12. The GW terminal 1 may have other structures.

Figure 14:
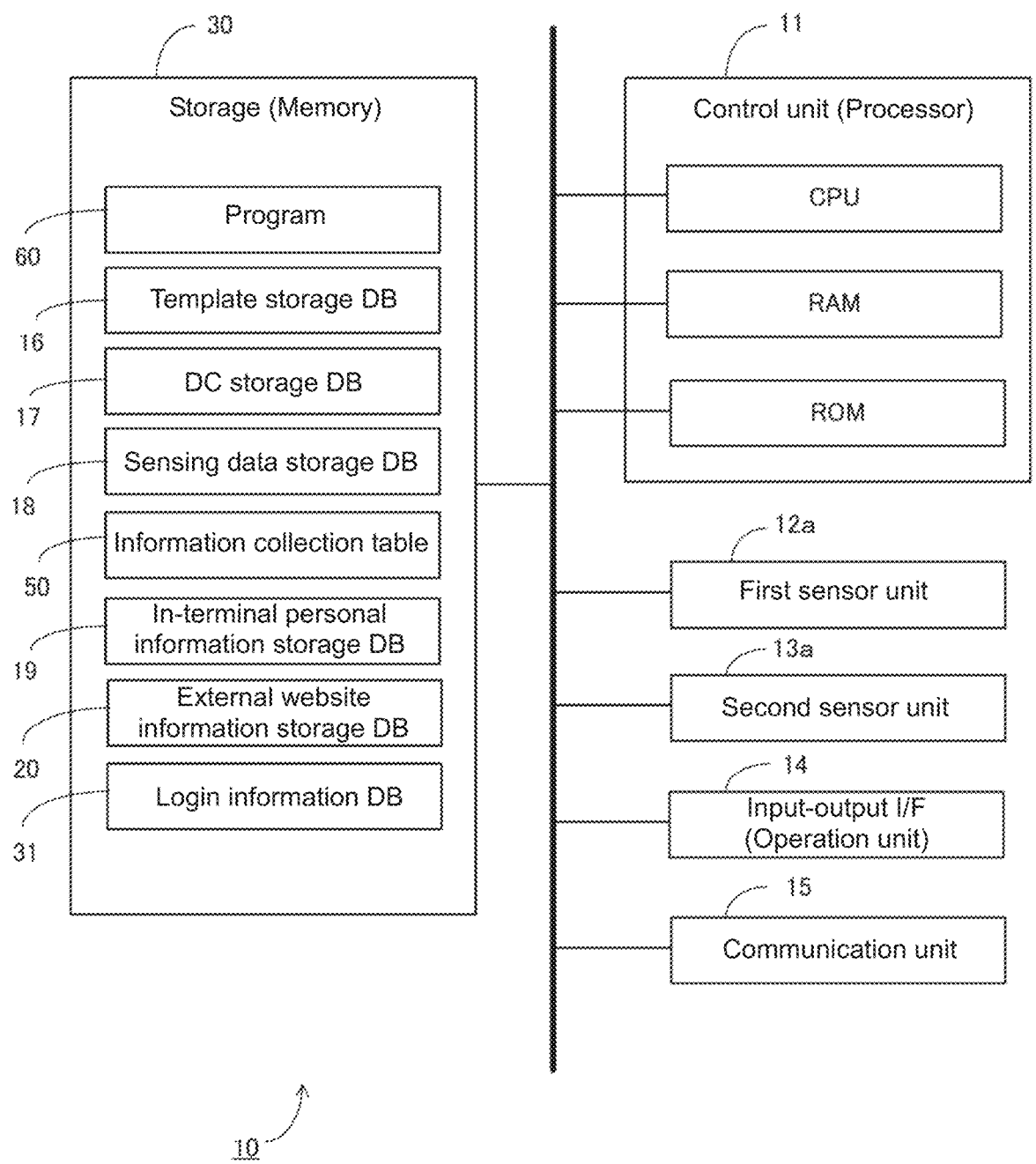
FIG. 14 is a diagram of a GW terminal according to a modification showing its hardware configuration.

FIG. 14 is a diagram of a GW terminal 10 according to one modification showing its hardware configuration. As shown in FIG. 14, the GW terminal 10 differs from the GW terminal 1 (FIG. 2) according to the above embodiment in including a first sensor unit 12*a* in place of the sensing device connection unit 12, A second sensor unit 13*a* is equivalent to the sensor unit 13 in the above embodiment.

In this modification, the first sensor unit 12*a* monitors a target to obtain sensing data. The obtained sensing data and metadata associated with the sensing data are provided from the GW terminal 10 to the application system 5. The modes of, for example, generating the provider DC 100, collecting metadata items to be associated with the sensing data, and providing the sensing data and the metadata to the application system from the GW terminal are the same as described in the above embodiment.

Although the registration of each sensing device 2 is performed in the above embodiment, such registration may be eliminated for the first sensor unit 12*a* in the modification. More specifically, the first sensor unit 12*a* may be pre-registered with the GW terminal 10.

REFERENCE SIGNS LIST

1, 10 GW terminal
2 sensing device
3 sensor network server
4 website
5 application system
6 network
11 control unit
12 sensing device connection unit
12*a* first sensor unit
13 sensor unit
13*a* second sensor unit
14 input-output I/F
15 communication unit
16 template storage DB
17 DC storage DB
18 sensing data storage DB
19 in-terminal personal information storage DB
20 external website information storage DB
21 sensing device registration unit
22 sensing data obtaining unit
23 external website information obtaining unit
24 data catalog generation unit
25 sensing data output limit unit
26 metadata association unit
30 storage
31 login information DB
35 bus
50 information collection table
60 program
71, 72 selection button
73, 74 edit button
75, 84, 93 enter button
81, 82, 83, 90, 91, 92 setting field
100 provider DC
100*a* first data catalog
100*b* second data catalog
101 user DC

The invention claimed is:

1. A sensor management unit comprising:
a processor; and
a memory storing a program executable by the processor,
wherein the memory is configured to store obtainment condition information that defines obtainment conditions for obtaining a plurality of candidate items of metadata to be associated with first sensing data, and
the program is configured to, when executed by the processor, cause the processor to implement operations comprising:
obtaining first sensing data, the first sensing data generated by monitoring a target with a first sensor,
obtaining at least one of the candidate items of metadata in accordance with the obtainment conditions defined by the obtainment condition information, and
transmitting, to an external device, the obtained first sensing data and the obtained metadata in a manner associated with each other, the external device installed external to the sensor management unit.

2. The sensor management unit according to claim 1, further comprising:
an input interface configured to receive selection of at least one of the candidate items of metadata,
wherein the transmitting includes transmitting, to the external device, the obtained first sensing data and the metadata items selected through the input interface in a manner associated with each other.

3. The sensor management unit according to claim 1, further comprising:
an input interface configured to receive selection of at least one of the candidate items of metadata,
wherein the obtaining at least one of the candidate items of metadata includes obtaining the metadata items selected through the input interface in accordance with the obtainment conditions.

4. The sensor management unit according to claim 1, wherein
the candidate items of metadata include personal information from which a user of the sensor management unit is identified, and the personal information is stored in a website on the Internet.

5. The sensor management unit according to claim 1, wherein
the candidate items of metadata include a use history of a website by a user of the sensor management unit, and the use history is stored in the website on the Internet.

6. The sensor management unit according to claim 4, wherein
the memory is configured to store login information used to log in the website, and
the obtaining at least one of the candidate items of metadata includes accessing the website using the login information.

7. The sensor management unit according to claim 4, wherein the obtainment conditions include a time to access the website.

8. The sensor management unit according to claim 1, wherein
the memory is configured to store personal information from which a user of the sensor management unit is identified, and
the candidate items of metadata include the personal information stored in the memory.

9. The sensor management unit according to claim 1, wherein
the program is configured to, when executed by the processor, further cause the processor to implement operations comprising obtaining second sensing data, the second sensing data generated by monitoring a target with a second sensor, and
the candidate items of metadata include the second sensing data.

10. The sensor management unit according to claim 1, wherein
the metadata obtained in the obtaining at least one of the candidate items of metadata includes personal information from which a user of the sensor management unit is identified, and the program is configured to, when executed by the processor, further cause the processor to implement operations comprising anonymizing the metadata into anonymized information, and
the anonymized information is information from which the user is not identified.

11. The sensor management unit according to claim 1, wherein
the metadata obtained in the obtaining at least one of the candidate items of metadata includes personal information from which a user of the sensor management unit is identified, and the program is configured to, when executed by the processor, further cause the processor to implement operations comprising either anonymizing the metadata into anonymized information or deleting the metadata, and
the anonymized information is information from which the user is not identified.

12. A method implementable by a sensor management unit, the method comprising:
storing obtainment condition information that defines obtainment conditions for obtaining a plurality of candidate items of metadata to be associated with first sensing data;
obtaining the first sensing data, the first sensing data generated by monitoring a target with a first sensor;
obtaining at least one of the candidate items of metadata in accordance with the obtainment conditions defined by the obtainment condition information; and
transmitting, to an external device, the obtained first sensing data and the obtained metadata in a manner associated with each other, the external device installed external to the sensor management unit.

13. A non-transitory computer-readable medium storing a program configured to be executed by a processor included in a sensor management unit,
the sensor management unit including a memory configured to store obtainment condition information that defines obtainment conditions for obtaining a plurality of candidate items of metadata to be associated with first sensing data, the program being configured to, when executed by the processor, cause the processor to implement operations comprising:
obtaining first sensing data, the first sensing data generated by monitoring a target with a first sensor;
obtaining at least one of the candidate items of metadata in accordance with the obtainment conditions defined by the obtainment condition information; and
transmitting, to an external device, the obtained first sensing data and the obtained metadata in a manner associated with each other, the external device installed external to the sensor management unit.

14. The sensor management unit according to claim 2, wherein the candidate items of metadata include personal information from which a user of the sensor management unit is identified, and the personal information is stored in a website on the Internet.

15. The sensor management unit according to claim 3, wherein the candidate items of metadata include personal information from which a user of the sensor management unit is identified, and the personal information is stored in a website on the Internet.

16. The sensor management unit according to claim 2, wherein the candidate items of metadata include a use history of a website by a user of the sensor management unit, and the use history is stored in the website on the Internet.

17. The sensor management unit according to claim 3, wherein the candidate items of metadata include a use history of a website by a user of the sensor management unit, and the use history is stored in the website on the Internet.

18. The sensor management unit according to claim 4, wherein the candidate items of metadata include a use history of a website by a user of the sensor management unit, and the use history is stored in the website on the Internet.

19. The sensor management unit according to claim 5, wherein the memory is configured to store login information used to log in the website, and the obtaining at least one of the candidate items of metadata includes accessing the website using the login information.

20. The sensor management unit according to claim 5, wherein the obtainment conditions include a time to access the website.

* * * * *